United States Patent
Park

(10) Patent No.: US 9,448,383 B2
(45) Date of Patent: Sep. 20, 2016

(54) VOICE COIL MOTOR AND DRIVING METHOD THEREOF

(75) Inventor: Sangok Park, Seoul (KR)

(73) Assignee: LG Innotek Co., Ltd., Seoul (KR)

(*) Notice: Subject to any disclaimer, the term of this patent is extended or adjusted under 35 U.S.C. 154(b) by 21 days.

(21) Appl. No.: 13/882,440

(22) PCT Filed: Feb. 22, 2011

(86) PCT No.: PCT/KR2011/001141
§ 371 (c)(1),
(2), (4) Date: Apr. 29, 2013

(87) PCT Pub. No.: WO2012/060521
PCT Pub. Date: May 10, 2012

(65) Prior Publication Data
US 2013/0215526 A1    Aug. 22, 2013

(30) Foreign Application Priority Data
Nov. 2, 2010 (KR) ............ 10-2010-0108427

(51) Int. Cl.
G02B 7/09 (2006.01)
H02K 33/18 (2006.01)
G02B 7/08 (2006.01)
H02K 41/035 (2006.01)

(52) U.S. Cl.
CPC . *G02B 7/09* (2013.01); *G02B 7/08* (2013.01); *H02K 33/18* (2013.01); *H02K 41/0356* (2013.01)

(58) Field of Classification Search
CPC .......... G02B 7/08; G02B 7/09; G02B 7/102; H02K 41/0354; H02K 41/0356; H02K 33/16; H02K 33/18; H02P 25/027; H02P 25/028
USPC ....... 359/822, 823, 824, 814; 310/12.16, 15, 310/20, 28–30
See application file for complete search history.

(56) References Cited

U.S. PATENT DOCUMENTS 4,297,537 A    10/1981 Babb
6,414,931 B1    7/2002 Maeda et al.
(Continued)

FOREIGN PATENT DOCUMENTS

CN    101193204 A    6/2008
CN    101261351 A    9/2008
(Continued)

OTHER PUBLICATIONS

English language translation of Sue Takeshi "Lens drive device", JP2007-248964, Sep. 27, 2007.*
(Continued)

*Primary Examiner* — Thomas K Pham
*Assistant Examiner* — Marin Pichler
(74) *Attorney, Agent, or Firm* — KED & Associates LLP

(57) ABSTRACT

A voice coil motor (VCM) is disclosed, the VCM including: a stator including a magnet generating a first electromagnetic field; a mover including a bobbin formed with a hollow hole through which light passes and a coil formed on a periphery of the bobbin that generates a second electromagnetic field responsive to the first electromagnetic field; a base fixed at the stator and formed with an opening through which the light passes; and at least one elastic member elastically supporting the bobbin and forming a gap between the bobbin and the base when the coil is not applied with a current.

10 Claims, 6 Drawing Sheets

(56) References Cited

U.S. PATENT DOCUMENTS

| | | | |
|---|---|---|---|
| 7,787,046 B2 | 8/2010 | Nagasaki | |
| 2004/0001603 A1 | 1/2004 | Sahyoun | |
| 2005/0275294 A1 | 12/2005 | Izumi et al. | 310/15 |
| 2006/0181632 A1 | 8/2006 | Makii et al. | |
| 2008/0024015 A1 | 1/2008 | Tanioka et al. | |
| 2008/0095524 A1* | 4/2008 | Hsiao | G03B 17/02 396/133 |
| 2008/0124068 A1* | 5/2008 | Kwon | G02B 7/38 396/127 |
| 2008/0198254 A1* | 8/2008 | Nagasaki | 348/335 |
| 2008/0259467 A1 | 10/2008 | Chung | |
| 2009/0015948 A1* | 1/2009 | Wada et al. | 359/824 |
| 2009/0085425 A1 | 4/2009 | Chang | |
| 2009/0102403 A1 | 4/2009 | Lule | |
| 2011/0236008 A1 | 9/2011 | Kang et al. | |

FOREIGN PATENT DOCUMENTS

| | | |
|---|---|---|
| JP | 2006-042408 A | 2/2006 |
| JP | 2006-058662 | 3/2006 |
| JP | 2007-248964 A | 9/2007 |
| JP | 2008-020668 A | 1/2008 |
| JP | 2008-020668 A | 1/2008 |
| JP | 2008-035645 A | 2/2008 |
| JP | 2008-178242 A | 7/2008 |
| JP | 2008-268404 A | 11/2008 |
| JP | 2008-281863 A | 11/2008 |
| JP | 2009-136081 A | 6/2009 |
| JP | 2009-150922 A | 10/2009 |
| JP | 2009-237192 A | 10/2009 |
| JP | 2009-271204 A | 11/2009 |
| JP | 2009-282090 A | 12/2009 |
| KR | 20-0376032 Y1 | 3/2005 |
| KR | 10-2006-0004253 | 1/2006 |
| KR | 10-0548869 B1 | 2/2006 |
| KR | 10-2006-0092067 A | 8/2006 |
| KR | 10-2007-0057595 A | 6/2007 |
| KR | 10-2008-0076841 A | 8/2008 |
| KR | 10-2009-0004286 A | 1/2009 |
| KR | 10-2009-0032905 A | 4/2009 |
| KR | 10-2009-0071686 | 8/2009 |
| KR | 10-2010-0082829 | 7/2010 |
| KR | 10-2011-0013966 A | 2/2011 |
| KR | 10-2011-0106664 A | 9/2011 |
| TW | 200915704 A | 4/2009 |

OTHER PUBLICATIONS

United States Office Action dated Jun. 16, 2014 issued in U.S. Appl. No. 14/204,715.
Korean Office Action dated Oct. 12, 2011 issued in Application No. 10-2010-0108427 (Full English Translation).
Korean Trial No. 2012100002687 A (with English Translation).
Japanese Office Action dated May 20, 2014 issued in Japanese Application No. 2013-536482 (Full English Translation).
U.S. Final Office Action dated Jul. 14, 2015 issued in U.S. Appl. No. 14/204,715.
Chinese Office Action issued in Application No. 201180052659.6 dated Jul. 22, 2015.
European Search Report for Application 15164805.2 dated Dec. 4, 2015.

* cited by examiner

VOICE COIL MOTOR AND DRIVING METHOD THEREOF

CROSS-REFERENCE TO RELATED APPLICATIONS

This application is the U.S. national stage application of International Patent Application No. PCT/KR2011/001141, filed Feb. 22, 2011, which claims priority to Korean Application No. 10-2010-0108427, filed Nov. 2, 2010, the disclosures of each of which are incorporated herein by reference in their entirety.

TECHNICAL FIELD

The present invention relates to a voice coil motor and a driving method of a voice coil motor.

BACKGROUND ART

Recently, a mobile terminal embedded with a super small digital camera has been developed. A super small digital camera formed on a conventional mobile terminal is disadvantageous in that a gap between an image sensor adapted to change an outside light to a digital image or a digital picture and a lens cannot be adjusted. However, a lens driving device such as a voice coil motor adapted to adjust a gap between an image sensor and a lens has been recently developed to enable obtainment of an improved digital image or digital picture in a super small digital camera.

Generally, a voice coil motor is configured such that a lens is mounted therein, a bobbin arranged on a base is upwardly moved from the base to adjust a gap between a lens and an image sensor mounted on a rear surface of the base. The bobbin of the voice coil motor is coupled with a leaf spring to allow the bobbin to contact the base at all times by way of elasticity of the leaf spring when the voice coil motor is not operated.

That is, the bobbin of the conventional voice coil motor is driven only to one upward direction relative to the base. The conventional voice coil motor that drives to one direction relative to the base inevitably and disadvantageously needs a driving force larger than that of the elasticity of the leaf spring and a self weight of the bobbin in order to drive the voice coil motor, resulting in increased power consumption of the voice coil motor.

Another disadvantage is that size of a coil wound on the bobbin or a magnet is increased by a driving force larger than the self weight of bobbin and elasticity of the leaf spring to drive the voice coil motor, resulting in an increased overall size of the voice coil motor.

Still another disadvantage is that a focus between the lens and the image sensor is not precisely adjusted to degrade quality of an image, if the leaf spring is deformed.

DISCLOSURE OF INVENTION

Technical Problem

The present invention is directed to a voice coil motor and a driving method of a voice coil motor configured to further improve the power consumption, size and quality of image in the voice coil motor.

Solution to Problem

In order to achieve at least the above objects, in whole or in part, and in accordance with the purpose of the disclosure, as embodied and broadly described, there is provided a voice coil motor, in one general aspect of the present invention, the motor characterized by: a stator including a magnet generating a first electromagnetic field; a mover including a bobbin formed with a hollow hole through which light passes and a coil formed on a periphery of the bobbin that generates a second electromagnetic field responsive to the first electromagnetic field; a base fixed at the stator and formed with an opening through which the light passes; and at least one elastic member elastically supporting the bobbin and forming a gap between the bobbin and the base when the coil is not applied with a current.

In some exemplary embodiment of the present invention, the elastic member may include a first elastic member connected to a bottom end of the bobbin and a second elastic member connected to an upper end opposite to the bottom end of the bobbin.

In some exemplary embodiment of the present invention, each of the first and second elastic members may include an inner elastic unit coupled to the bobbin, an outer elastic unit connectively coupled to the stator, and a connection elastic unit connecting the inner and outer elastic units.

In some exemplary embodiment of the present invention, the inner elastic unit may be arranged at a bottom surface of the outer elastic unit by droop caused by a self weight of the mover.

In some exemplary embodiment of the present invention, the inner elastic unit may be arranged at a position higher than that of the outer elastic unit in consideration of the droop by the self weight of the mover, and the first and second elastic members may be arranged in parallel with an upper surface of the base.

In some exemplary embodiment of the present invention, the voice coil motor may further include a cover can fixed at the base to cover the mover and the stator, and shock absorption members may be arranged at any one of the base opposite to the bobbin and an inner surface of the cover can opposite to the bobbin.

In some exemplary embodiment of the present invention, first and second shock absorption members may be arranged on the base opposite to the bobbin and the inner surface of the cover can opposite to the bobbin.

In some exemplary embodiment of the present invention, the shock absorption members may include any one of a sponge, a synthetic resin having an elasticity and a rubber.

In another general aspect of the present invention, a voice coil motor is provided, the voice coil motor characterized by: a stator including a magnet generating a first electromagnetic field; a mover including a bobbin formed with a hollow hole through which light passes and a coil formed on a periphery of the bobbin that generates a second electromagnetic field responsive to the first electromagnetic field; a base fixed at the stator and formed with an opening through which the light passes; and an elastic member elastically supporting the bobbin, wherein the bobbin supported by the elastic member is driven to any one direction of a first direction distancing from the base by an ascending power generated by the first and second electromagnetic fields, and a second direction approaching the base by a descending power generated by the first and second electromagnetic fields.

In some exemplary embodiment of the present invention, a forward current may be applied to the coil when the bobbin is driven to the first direction, and a backward current that flows in opposition to the forward current may be applied to the coil when the bobbin is driven to the second direction.

In some exemplary embodiment of the present invention, the voice coil motor may drive the bobbin to any one direction of the first direction and the second direction by adjusting a voltage difference across the coil.

In still another general aspect of the present invention, a voice coil motor is provided, the voice coil motor characterized by: a stator including a magnet generating a first electromagnetic field; a mover including a bobbin formed with a hollow hole through which light passes and a coil formed on a periphery of the bobbin that generates a second electromagnetic field responsive to the first electromagnetic field; a base fixed at the stator and formed with an opening through which the light passes; at least one elastic member elastically supporting the bobbin and forming a gap between a bottom end of the bobbin and an upper surface of the base; and a driving module including a control unit generating an ascending control signal for ascending the bobbin and a descending control signal for descending the bobbin, and a current providing unit providing either a forward current or a backward current to the coil in response to the ascending control signal and the descending control signal of the control unit.

In some exemplary embodiment of the present invention, the current providing unit may include a first unit circuitry in which first and second switch elements are connected in series, and a second unit circuitry in which third and fourth switch elements are connected in series, wherein the first and second unit circuitries are electrically connected in parallel relative to power, a first distal end of the coil is connectively interposed between the first and second switch elements, and a second distal end of the coil is connectively interposed between the third and fourth switch elements.

In some exemplary embodiment of the present invention, the ascending control signal may be provided to the first and second switch elements to apply the forward current to the coil, and the descending control signal may be provided to the third and fourth switch elements to apply the backward current to the coil.

In a still further general aspect of the present invention, there is provided a method for driving a voice coil motor, the method characterized by: moving a bobbin to a reference position by applying a first current to a coil wound on the bobbin embedded with a lens and elastically supported by an elastic member by being distanced from a base; applying to the coil a second current flowing in a direction opposite to the first current to distance the bobbin from the reference position; and stopping the bobbin at a position corresponding to an optimum focus by constantly maintaining an amount of the second current when the optimum focus is formed between the lens and an image sensor.

In some exemplary embodiment of the present invention, the reference position may be one of an upper surface of the base and an inner lateral surface of a cover can covering the bobbin.

In some exemplary embodiment of the present invention, the amount of second current in the step of distancing the bobbin from the reference position may continuously increase.

In some exemplary embodiment of the present invention, the step of stopping the bobbin at a position corresponding to an optimum focus may include moving the bobbin to a position deviated from the position of the optimum focus, and returning the bobbin to the position of the optimum focus by re-applying the first current to the coil.

In a still further general aspect of the present invention, there is provided a method for driving a voice coil motor, the method characterized by: moving a bobbin to a reference position by applying a first current to a coil wound on the bobbin embedded with a lens and elastically supported by an elastic member by being distanced from a base; calculating a data for forming an optimum focus between a lens and an image sensor module based on an object; and moving the bobbin to the reference position based on the data by applying to the coil a second current flowing in opposition to the first current relative to the data.

In some exemplary embodiment of the present invention, the second current may be an amount of a current having a predetermined intensity.

Technical problems to be solved by the present invention are not restricted to the above-mentioned description, and any other technical problems not mentioned so far will be clearly appreciated from the following description by skill in the art.

Advantageous Effects of Invention

The voice coil motor and a method for driving the voice coil motor according to the present invention has an advantageous effect in that a bobbin mounted with a lens is distanced from an upper surface of a base mounted with an image sensor, and a mover including the bobbin is driven to a direction distanced from the base or a direction approaching the base by applying a forward current or a backward current to a coil block wound on the bobbin, to reduce power consumption of the voice coil motor and to adjust a focus between the lens and the image sensor within a rapid period of time.

The voice coil motor and a method for driving the voice coil motor according to the present invention has another advantageous effect in that a contact noise generated by driving of the bobbin can be reduced.

BRIEF DESCRIPTION OF DRAWINGS

Non-limiting exemplary embodiments of the present invention will be described in detail with reference to the accompanying drawings. Like reference numerals refer to like parts or portions throughout the description of several views of the drawings.

BEST MODE FOR CARRYING OUT THE INVENTION

The advantages, features and methods for achieving the foregoing will be apparent from the accompanying drawings and exemplary embodiments that follow.

Embodiments of the present invention are described below by way of example only.

These examples represent the best ways of putting the invention into practice that are currently known to the Applicant although they are not the only ways in which this could be achieved.

This invention may be embodied in various forms and should not be construed as limited to the embodiments set forth herein. Rather, these embodiments are provided so that this disclosure will be thorough and complete, and will fully convey the scope of the invention to those skilled in the art.

Figure 1:
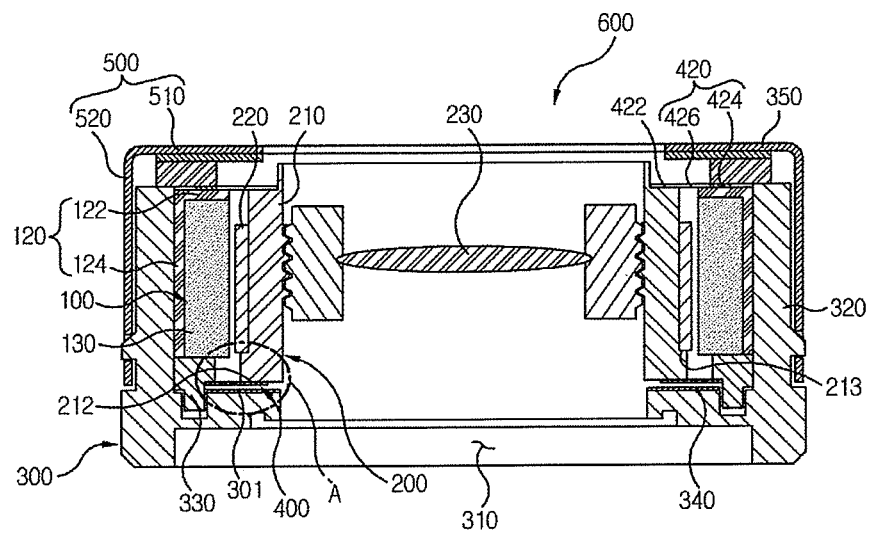
FIG. 1 is a cross-sectional view illustrating a voice coil motor according to an exemplary embodiment of the present invention.
Figure 2:
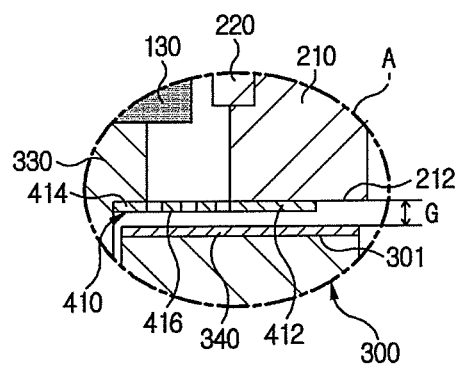
FIG. 2 is a partial enlarged view of 'A' of FIG. 1.

FIG. 1 is a cross-sectional view illustrating a voice coil motor according to an exemplary embodiment of the present invention, and FIG. 2 is a partial enlarged view of 'A' of FIG. 1.

Referring to FIGS. 1 and 2, a voice coil motor (600) may include a stator (100), a mover (200), a base (300) and an elastic member (400).

The stator (100) may include a yoke (120) and a magnet (130). The stator (100) generates a first electromagnetic field for driving the mover (200. described later). The yoke (120) may include a yoke upper plate (122) and a yoke lateral plate (124). The yoke (120) functions to block the electromagnetic field generated by the magnet (130. described later) and the mover (200), and improves a driving efficiency of the mover (200) by causing the electromagnetic field not facing the mover (200) among the electromagnetic field generated by the magnet (130) to face the mover (200).

The yoke upper plate (122) may take the shape of a square plate, when seen on a plane, and may be centrally formed with an opening for exposing a lens (described later) of the mover (200). The yoke lateral plate (124) may be extended from an edge of the yoke upper plate (122) to form a space for accommodating the magnet (130) by way of the yoke lateral plate (124) and the yoke upper plate (122).

A plurality of magnets (130) may be fixed on an inner lateral surface of the yoke lateral plate (124) to generate the first electromagnetic field for driving the mover (200). The mover (200) may include a bobbin (210) and a coil block (220), and be fixed therein by a lens barrel and a lens (230). The mover (200) moves relative to the stator (100) to adjust a gap between an image sensor arranged underneath the base (300. described later) and the lens (230).

The bobbin (210) may take the shape of a cylinder formed with a hollow hole, for example, and be formed therein with a thread for fixing the lens (230). The bobbin (210) may be formed at a bottom periphery with a sill (213) for fixing the coil block (220. described later).

The coil block (220) may be fixed at a periphery of the bobbin (210).

The coil block (220) may be formed by directly winding a wire insulated by enamel resin on a periphery of the bobbin (210), or by winding a wire in a cylindrical shape and bonding the wound wire on the periphery of the bobbin (210) using an adhesive.

The coil block (220) may generate a second electromagnetic field by way of a current applied from outside, and an attractive force and a repulsive force may be generated between the mover (200) and the stator (100) by a direction of a current applied to the coil block (220).

The base (300) may take the shape of a plate to fix the stator (100), and may be centrally formed with an opening (310) through which light having passed the lens (230) embedded in the bobbin (210) of the mover (200).

Each of four corners on an upper surface of the plate-shaped base (300) may be formed with a coupling pillar (320), and the coupling pillar (320) may function to couple a can (described later) to the base (300). The base (300) may be fixed at a rear surface thereof with an image sensor that generates an image corresponding to the light that has passed the lens (230). A frame-shaped spacer (330) may be arranged between the base (300) and the magnet (130) of the stator (100).

The elastic member (400) may include a first elastic member (410) and a second elastic member (420). The elastic member (400) may elastically support the bobbin (210) of the mover (200). The elastic member (400) may form a gap (G) between a bottom surface (212) of the bobbin (210) and an upper surface (301) of the base (300) when no current is applied to the coil (220).

In the exemplary embodiment of the present invention, in a case the mover (200) is distanced from the upper surface (301) of the base (300) when no current is applied to the coil using the elastic member (400) as shown in FIG. 5(*a*), the mover (200) may be driven either to a downward direction facing the base (300) or to an upward direction distancing from the base (300) according to changed current direction.

That is, in a case the mover (200) is distanced from the upper surface (301) of the base (300) using the elastic member (400) when no current is applied to the coil (220), the mover (200) may be driven either to a downward direction or to an upward direction in a still state.

The first elastic member (410) may be elastically coupled to the bottom surface (212) of the bobbin (210) facing the base (300). Two first elastic members (410) may be formed, each member being elastically insulated from the other. Any one first elastic member (410) may be electrically connected to a distal end of the wire forming the coil block (220), and the other first elastic member (410) may be electrically connected to the other distal end facing the distal end of the wire.

Now, referring to FIG. 2, each of the first elastic members (410) may commonly include an inner elastic unit (412), an outer elastic unit (414) and a connection elastic unit (416).

The inner elastic unit (412) may be coupled to the bottom surface (212) of the bobbin (210), the outer elastic unit (414) may be coupled by the spacer (330) and the connection elastic unit (416) may elastically connect the inner elastic unit (412) and the outer elastic unit (414). The connection elastic unit (416) may be formed by bending the thin narrow-width linear type elastic member, when viewed on a plane.

Each of the outer elastic unit (414) of the first elastic members (410) may be partially protruded, and the protruded portion is bent along a lateral surface of the base (300) to be electrically connected to an outside circuit substrate. A current is applied to each outer elastic unit (414) of the first elastic members from the outside circuit substrate, and the current provided to the each outer elastic unit (414) is provided to the coil block (220), whereby the second electromagnetic field for ascending/descending the mover (200) is generated from the coil block (220).

The second elastic member (420) may be elastically coupled to the upper surface (214) facing the bottom surface (212) of the bobbin (210) facing the base (300). The second elastic member (420) may include an inner elastic unit (422), an outer elastic unit (424) and a connection elastic unit (426).

The inner elastic unit (422) may be coupled to the upper surface (214) facing the bottom surface (212) of the bobbin (210), the outer elastic unit (424) may be arranged on the yoke upper plate (122) of the yoke (120), and the connection elastic unit (426) may be connected to the inner and outer elastic units (422, 424).

Figure 5A:
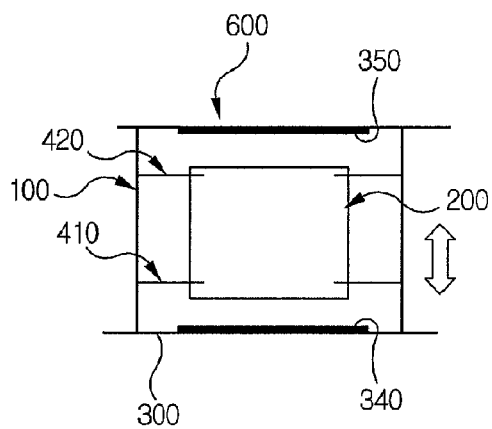
FIGS. 5(a) and 5(b) are schematic cross-sectional views illustrating a voice coil motor according to an exemplary embodiment of the present invention.
Figure 5B:
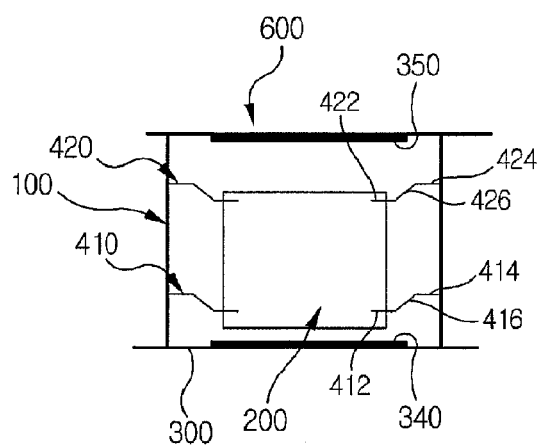

In the present exemplary embodiment, the inner elastic unit (412) of the first elastic member (410) connected to the mover (200) and the inner elastic unit (422) of the second elastic member (420) are arranged at a place lower than that of the outer elastic unit (414) because of a self weight of the mover (200) and gravity as shown in FIG. 5(b).

As a result, the gap (G) formed between the bottom surface (212) of the bobbin (210) and an upper surface (301) of the base (300) is preferably set up in consideration of droop of the inner elastic unit (422) caused by the self weight of the mover (200) and gravity.

In another exemplary embodiment, the connection elastic members (416, 426) may be deformed to allow the inner elastic units (412, 422) of the first and second elastic members (410, 420) to be formed at a position higher than that of the outer elastic units (414, 424), thereby preventing the mover (200) from drooping due to self weight of the mover (200) and the gravity.

In a case the inner elastic units (412, 422) of the first and second elastic members (410, 420) are placed on a high position than the outer elastic units (414, 424) in consideration of the droop of the mover (200) by self weight of the mover (200) and the gravity, the first and second elastic members (410, 420) may be arranged in parallel with the upper surface (301) of the base (300).

Referring back to FIG. 1, the voice coil motor (600) may further include a cover can (500).

The cover can (500) may include an upper plate (510) formed with an opening for exposing the lens (230) of the mover (200) and formed in the shape of a plate corresponding to the base (300), and a lateral plate (520) extended from an edge of the upper plate (510) to the base (300), where the lateral plate (520) is coupled to the lateral surface of the base (300).

Referring back to FIG. 1, the mover (200) according to an exemplary embodiment of the present invention may be driven to either a first direction facing the base (300) or a second direction opposite to the first direction. Therefore, the mover (200) may collide with the base (300) or the upper plate (510) of the cover can (500) while being driven to the first direction or to the second direction, whereby noise can be generated due to deformation of the first and second elastic members (410, 420) or collision. Therefore, the voice coil motor (600) may further include a first shock absorption member (340) and a second shock absorption member (350) in order to prevent generation of noise.

The first shock absorption member (340) may be formed on the upper surface (301) of the base (300) facing the bottom surface (212) of the bobbin (210), and the second shock absorption member (350) may be arranged at an inner lateral surface of the cover can (500) facing the upper surface (214) of the bobbin (210). The first shock absorption member (340) and the second shock absorption member (350) may include any one of a sponge, a synthetic resin having elasticity and a rubber.

Figure 3:
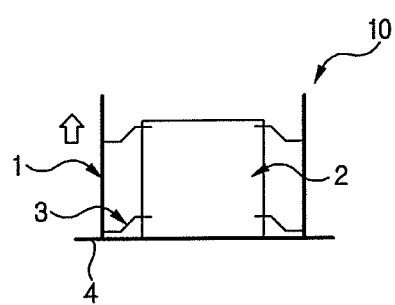
FIG. 3 is a cross-sectional view illustrating a conventional voice coil motor to compare with that of the exemplary embodiment of the present invention.
Figure 4:
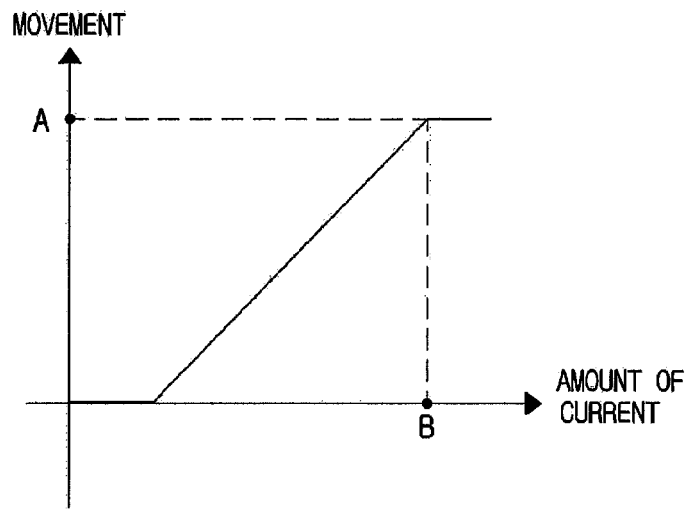
FIG. 4 is a graph illustrating a relation between a driving current amount for driving the voice coil motor of FIG. 3 and a moving amount according to the present invention.

FIG. 3 is a cross-sectional view of a conventional voice coil motor for comparing with the voice coil motor according to an exemplary embodiment of the present invention, and FIG. 4 is a graph illustrating a relation between an amount of driving current for driving the voice coil motor of FIG. 3 and movement.

Referring to FIGS. 3 and 4, a bobbin of a conventional voice coil motor (10) and a mover (2) including a coil block are elastically coupled to a stator (1) by an elastic member (3), and the mover (2) is arranged on a base (4) by the elastic member (3) generating elasticity pressing the mover (2) in a direction facing the base (4).

FIG. 3 shows a mover (2) that is not applied with a driving current for driving the mover (2).

A current is applied to the coil block of the mover (2) for adjusting a focus between an image sensor and the mover (2) by widening a gap between the image sensor arranged underneath the base (4) and a lens included in the mover (2), whereby an electromagnetic field is generated by the coil block.

The electromagnetic field generated by the coil block reacts with the electromagnetic generated by a magnet of the stator (1) to generate an ascending force to a direction facing an upper surface of the base (4). The ascending force increases in proportion to the intensity of the current applied to the coil block.

Referring to FIGS. 3 and 4, the mover (2) of the conventional voice coil motor (10) is not distanced from the base (4) until a current applied to the coil block by the elasticity depressing the mover (2) downward according to a self weight of the mover (2) and gravity reaches a point of start current of a horizontal axis in the graph of FIG. 4.

As shown in the graph of FIG. 4, in a case the current applied to the coil block is greater than the start current, the ascending force applied to the mover (2) becomes greater than the self weight of the mover (2) and the elasticity of the elastic member (3), whereby the mover (2) is distanced from the base (4) of the mover (2).

Successively, the current applied to the coil block continuously increases to keep increasing a gap between the mover (2) and the base (4) until the current reaches a B point in the graph of FIG. 4.

Meanwhile, the elasticity of elastic member (3) also increases as the gap between the mover (2) and the base (4) continuously increases, whereby the mover (2) is distanced from an upper surface of the base (4) as much as A at a particular current (B). For example, in a case a current of approximately 80 mA is provided to the coil block, the mover (2) stops short of ascending further from a particular position.

Figure 6:
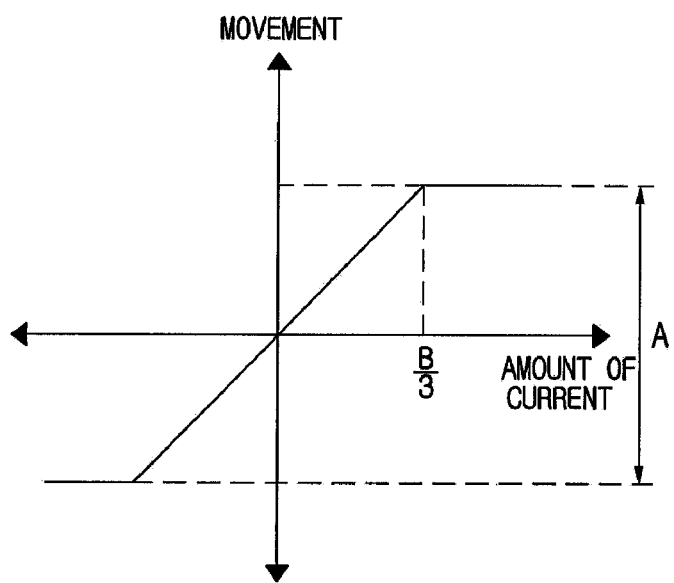
FIG. 6 is a graph illustrating a relation between a driving current amount for driving the voice coil motor of FIG. 5 and a moving amount according to the present invention.

FIGS. 5(a) and 5(b) are schematic cross-sectional views of a voice coil motor according to an exemplary embodiment of the present invention, and FIG. 6 is a graph illustrating a relation between a driving current for driving a voice coil motor and a movement.

Referring to FIGS. 1, 5 and 6, the mover (20) including a bobbin (210) and a coil block (220) is elastically coupled to the stator (100) by the first and second elastic members (410, 420) of the elastic member (400), and the mover (200) is distanced from the upper surface of the base (300) in a case a current is not applied to the b coil block (220) by the elasticity of the first and second elastic members (410, 420).

The coil block (220) of the mover (200) is applied with a current of forward direction, for example, in order to widen a gap between the image sensor arranged underneath the base 300 and the lens included in the mover (200), whereby a first electromagnetic field is generated from the coil block (220). The first electromagnetic field generated from the coil block (220) reacts with the electromagnetic generated by a magnet (130) of the stator (100) to generate an ascending force to a direction facing an upper surface of the base 300. The ascending force increases in proportion to the intensity of the forward current applied to the coil block (220).

As depicted in FIGS. 5(a) and 6, the elastic members (410, 420) of the voice coil motor (600) according to the exemplary embodiment of the present invention do not depress the mover (200) to a direction facing the base (300) when a current is not applied to the mover (200), such that, upon application of forward current to the coil block (220), the mover (200) starts to ascend to a first direction distancing from the upper surface of the base (300).

Now, a current in an area where Y axis becomes a positive number in the graph of FIG. 6 is defined as a "forward current", while a current in an area where Y axis becomes a negative number in the graph of FIG. 6 is defined as a "backward current".

Furthermore, because the mover (200) of the voice coil motor (600) according to the exemplary embodiment of the present invention has been already distanced from the base before the forward current is applied to the mover (200), even a small amount of current of an approximately 25 mA (approximately ⅓ of 80 mA necessary for reaching the A point in the conventional voice coil motor illustrated in FIG. 4) is sufficient enough to reach the A point.

That is, in the exemplary embodiment of the present invention, even a small amount of current can ascend the mover (200) to a desired position, because the mover (200) is already in a position distanced from the upper surface of the base (300) before the current is applied to the coil block (220), using the first and second elastic members (410, 420).

Meanwhile, a current of backward direction (instead of forward direction) is applied to the coil block (220) in order to drive the mover (200) of the voice coil motor (600) according to the exemplary embodiment of the present invention to a second direction approaching the base (300).

A descending force is generated on the coil block (220) by the electromagnetic field generated by the backward current applied to the coil block (220) and the electromagnetic field generated by the magnet (130), and the mover (200) is moved to a direction facing the upper surface (301) of the base (300) by the descending force as shown in FIG. 5(b) to allow the mover (200) to be arranged on the upper surface (301) of the base (300).

Figure 7:
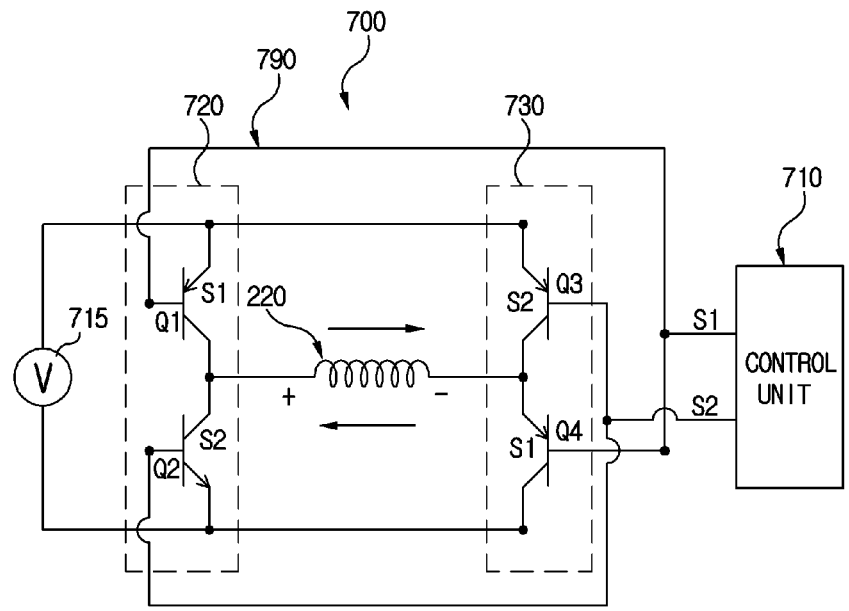
FIG. 7 is a block diagram illustrating a driving circuit for ascending or descending a mover of a voice coil motor according to an exemplary embodiment of the present invention.

FIG. 7 is a block diagram illustrating a driving circuit for ascending or descending a mover of a voice coil motor according to an exemplary embodiment of the present invention.

Referring to FIGS. 1 and 7, the mover (200) is distanced from the upper surface (301) of the base (300) by the first and second elastic members (410, 420) when no current is applied to the coil block (220) of the mover (200), and the mover (200) is driven to a first direction facing the upper surface (301) of the base (300) or a second direction opposite to the first direction by the current applied to the coil block (220) of the mover (200) distanced from the upper surface (301) of the base (300).

A voice coil motor (800) may include a driving module (700) for changing the flow of current applied to the coil block (220) in order to drive the mover (200) to any one direction of the first direction and the second direction. The driving module (700) may include a control unit (710) and a current providing unit (790).

The control unit (710) is electrically connected to an outside circuit substrate to generate an ascending control signal (S1) and a descending control signal (S2).

The ascending control signal (S1) is a control signal for increasing the gap between the bobbin (210) of the voice coil motor and the upper surface (301) of the base (300), and the descending control signal (S2) is a control signal for decreasing the gap between the bobbin (210) of the voice coil motor and the upper surface (301) of the base (300).

The current providing unit (790) provides to the coil block (220) a current of forward direction" for increasing the gap between the mover (200) and the upper surface (301) of the base (300) in response to the ascending control signal (S1), and the current providing unit (790) also provides to the coil block (220) a current of backward direction" for decreasing the gap between the mover (200) and the upper surface (301) of the base (300) in response to the descending control signal (S2).

The current providing unit (790) may include a power source (715), a first unit circuitry (720) and a second unit circuitry (730).

The first unit circuitry (720) may include first and second switch elements (Q1, Q2). In the exemplary embodiment of the present invention, the first and second switch elements (Q1, Q2) may be respectively transistors including input terminals, output terminals and gates. The output terminal of the first switch element (Q1) is connected to the output terminal of the second switch terminal (Q2).

The second unit circuitry (730) may include third and fourth switch elements (Q3, Q4). In the exemplary embodiment of the present invention, the third and fourth switch elements (Q3, Q4) may be respectively transistors including input terminals, output terminals and gates. The output terminal of the third switch element (Q3) is connected to the output terminal of the fourth switch terminal (Q4).

In the exemplary embodiment of the present invention, the first and second switch elements (Q1, Q2) are connected to the power source (715) in parallel. That is, input terminals of the first and second switch elements (Q1, Q2) at the first unit circuitry (720) and the input terminals of the third and fourth switch elements (Q3, Q4) at the second unit circuitry (730) are respectively inputted by a current provided from the power source (715).

Meanwhile, output terminals of the first and second switch elements (Q1, Q2) at the first unit circuitry (720) and the output terminals of the third and fourth switch elements (Q3, Q4) at the second unit circuitry (730) are respectively and electrically connected to one distal end of a line comprising the coil block (220) and the other end facing the one distal end.

In terms of operation, the ascending control signal (S1) outputted from the control unit (710) is applied to a gate of the first switch element (Q1) and to a gate of the fourth switch element (Q4). The descending control signal (S2) outputted from the control unit (710) is electrically connected to a gate of the second switch element (Q2) and to a gate of the third switch element (Q3).

Figure 8:
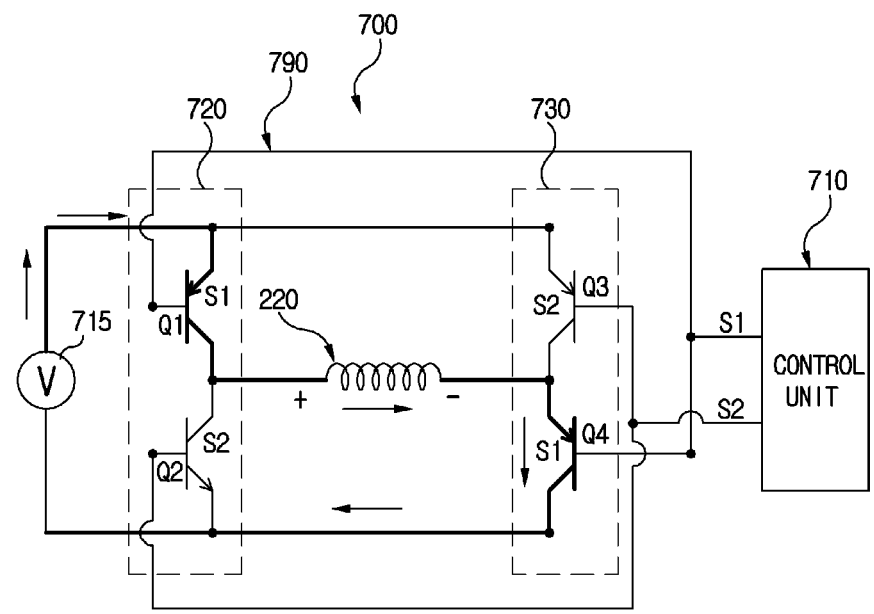
FIGS. 8 and 9 are block diagrams illustrating a forward direction current and a backward direction current applied to a coil block by a driving circuit.

Therefore, as illustrated in FIG. 8, in a case the ascending control signal (S1) is outputted from the control unit (710), the ascending control signal (S1) is also applied to the gate of the first switch element (Q1) and the gate of the fourth switch element (Q4). That is, the first switch element (Q1), the coil block (220), the fourth switch element (Q4) and the power source (715) form a closed circuit to thereby apply a "current of forward direction" to the coil block (220).

The gap between the mover (200) of the voice coil motor (700) and the upper surface (301) of the base (300) increases as the current of forward direction is applied to the coil block (220).

Figure 9:
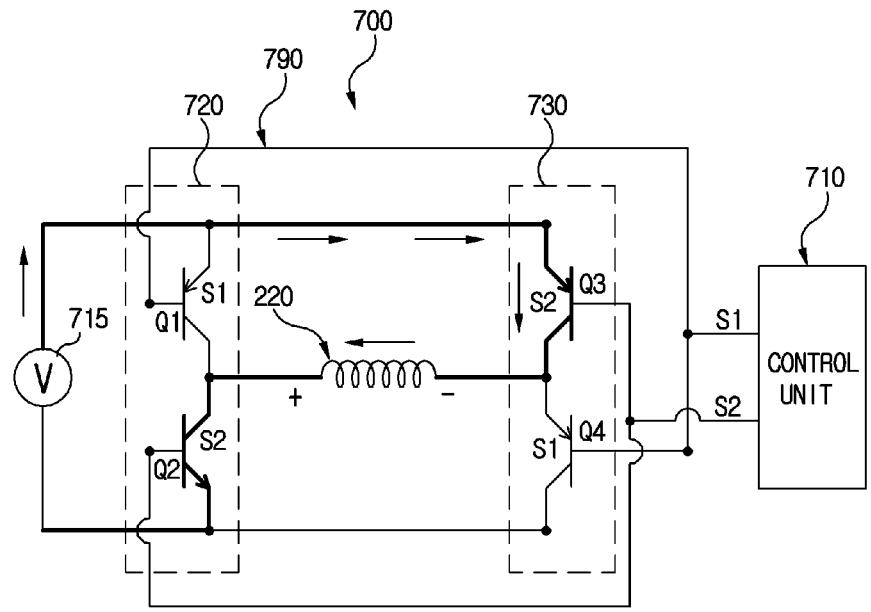

Meanwhile, as illustrated in FIG. 9, in a case the descending control signal (S2) is outputted from the control unit (710), each gate of the first and second switch elements (Q1, Q2) is also applied with the descending control signal (S2). As a result, the third switch element (Q3), the coil block (220), the second switch element (Q2) and the power source (715) form a closed circuit to thereby apply a "current of backward direction" to the coil block (220) that is opposite to the current of forward direction. In a case a "current of backward direction" is applied to the coil block (220), the gap between the mover (200) of the voice coil motor (700) and the upper surface (301) of the base (300) decreases.

In the present exemplary embodiment of the present invention, although a configuration is explained and illustrated in which four switch elements (Q1, Q2, Q3, Q4) are used to variably control the directions of current flowing in the coil block (220), the directions of current flowing in the coil block (220) may be changed using various other electrical elements.

In the present exemplary embodiment of the present invention, although a configuration is explained and illustrated in which four switch elements (Q1, Q2, Q3, Q4) are used to variably control the directions of current flowing in the coil block (220), a voltage difference across the coil block (220) may be adjusted to ascend or descend the bobbin (210) by applying a voltage across the coil block (220).

MODE FOR THE INVENTION

Now, a method for driving a voice coil motor according to an exemplary embodiment of the present invention will be described.

Figure 10:
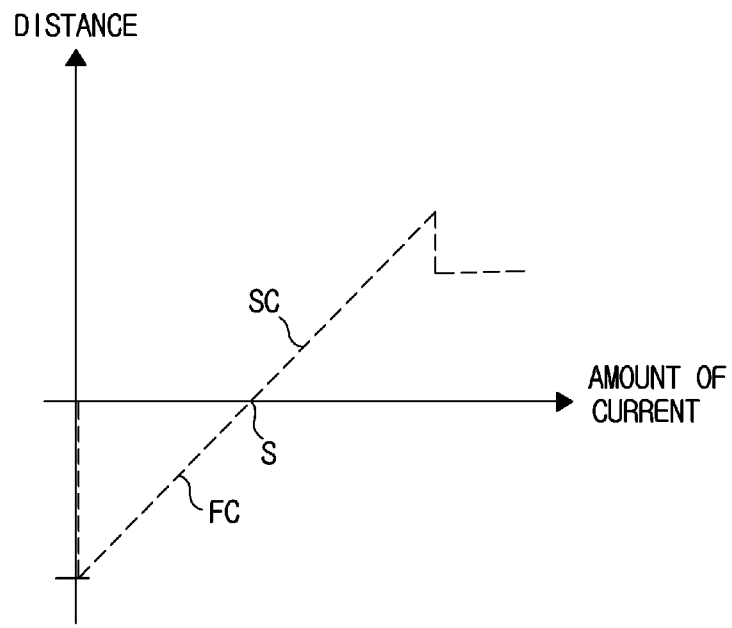
FIGS. 10 and 11 are graphs illustrating a method for driving a voice coil motor according to the present invention.

Referring to FIGS. 1 and 10, the current of backward direction (FC) is applied to the coil block (220) to move the bobbin (210) to the reference position, where the coil block (220) is arranged at a place distanced from the upper surface (301) of the base (300) fixed by the magnet (130) of the voice coil motor (700), elastically supported by elastic member (400) including first and second elastic members (410, 420), and embedded with the lens (230).

The reference position in the exemplary embodiment of the present invention may be the upper surface (301) of the base (300).

Successively, the current of backward direction (FC) is increased on the coil block (220) to distance the bobbin (210) from the reference position, and if the bobbin (210) reaches an initial position (S), a current of forward direction (SC) is applied. The current of forward direction (SC) may increase continuously or in a stair formation.

Thereafter, the current of forward direction (SC) is maintained at a constant level when an optimum focus that is required by a lens (230) fixed at the bobbin (210) and the image sensor module is formed, to thereby stop the bobbin (210) at a position corresponding to that of the optimum focus.

Using the process of stopping the bobbin (210) at a position corresponding to the optimum focus, a process of moving the bobbin (210) to a place a bit deviated from the position of the optimum focus and a process of a bit decreasing the current of forward direction to the coil block (220), the bobbin (210) can be returned to a position of the optimum focus, whereby a fine focusing process is performed to minutely adjust a focus between the lens (230) of the bobbin (210) and the image sensor module.

Successively, an object and the optimum focus are formed between the image sensor module and the lens (230), where the image sensor module generates an image of the object.

Figure 11:
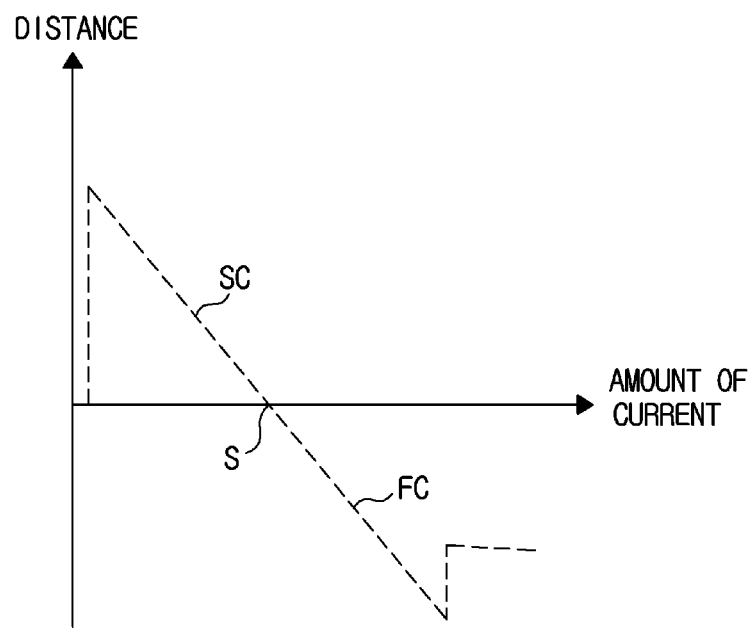

Meanwhile, referring to FIGS. 1 and 11, the current of forward direction (SC) is applied to the coil block (220) to move the bobbin (210) to the reference position, where the coil block (220) is arranged at a place distanced from the upper surface (301) of the base (300) fixed by the magnet (130) of the voice coil motor (700), elastically supported by elastic member (400) including first and second elastic members (410, 420), and embedded with the lens (230).

The reference position in the exemplary embodiment of the present invention may be an inner lateral surface of the upper surface (501) of the cover can (510).

Successively, the current of forward direction (SC) is decreased on the coil block (220) to distance the bobbin (210) from the upper plate (510) of cover can (510) which is the reference position, and if the bobbin (210) reaches an initial position (S), a current of backward direction (FC) is applied. The current of backward direction (FC) may increase continuously or in a stair formation.

Thereafter, the current of backward direction (FC) is maintained at a constant level when an optimum focus that is required by a lens (230) fixed at the bobbin (210) and the image sensor module is formed, to thereby stop the bobbin (210) at a position corresponding to that of the optimum focus.

Using the process of stopping the bobbin (210) at a position corresponding to the optimum focus, a process of moving the bobbin (210) to a place a bit deviated from the position of the optimum focus and a process of a bit increasing the current of backward direction (SC) to the coil block (220), the bobbin (210) can be returned to a position of the optimum focus, whereby a fine focusing process is performed to minutely adjust a focus between the lens (230) of the bobbin (210) and the image sensor module.

Successively, an object and the optimum focus are formed between the image sensor module and the lens (230), where the image sensor module generates an image of the object.

Although the method for driving the voice coil motor according to exemplary embodiment of the present invention has described a method in which the bobbin (210) is brought into contact with any one of the upper surface (301) of the base (300) or an inner lateral surface of the upper plate (510) of the cover can (500) to set up a reference position, and a current is applied to the coil block (220) until the bobbin (210) reaches a position formed by the image sensor module and the optimum focus from the reference position to thereby adjust a focus between the mover (200) and the image sensor module, another method may be alternatively applied in which the bobbin (210) is moved to a reference position by applying a first current to the coil block (220) that is elastically supported at a place distanced from the upper surface (301) of the base fixed by the magnet (130), and embedded with the lens (230), a data is calculated for maintaining an optimum focus between the lens (230) and the image sensor module based on the object, and an amount of current corresponding to the data is applied to the coil block (220) to move the bobbin (210) to the reference position based on the data.

At this time, the amount of current may have the intensity corresponding to the data, and the reference position may be the inner lateral surface of the upper plate (510) or the upper surface (301) of the base (300).

INDUSTRIAL APPLICABILITY

As apparent from the foregoing, the present invention has an industrial applicability in that a bobbin mounted with a lens is distanced from an upper surface of a base mounted with an image sensor, and a current of forward direction or backward direction is applied to a coil block wound on the bobbin to drive the mover including the bobbin to a direction distancing from the base or approaching the base, whereby power consumption by the voice coil motor can be reduced to adjust a focus between the lens and the image sensor within a faster period of time and to reduce a contact noise caused by driving of the bobbin.

While the present invention has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

The invention claimed is:

1. A method of driving a voice coil motor (VCM) that includes a stator including a magnet and a base, a mover including a bobbin and a coil block at a periphery of the bobbin, a cover coupled to the base, and an elastic member including a first elastic member and a second elastic member, wherein the first elastic member includes a first member connected to one end of the coil block and a second member connected to the other end of the coil block and separated from the first member, wherein each of the first member and the second member includes a first inner elastic unit coupled to a lower portion of the bobbin, a first outer elastic unit and a first connection elastic unit connecting the first inner elastic unit and the first outer elastic unit, and wherein the second elastic member includes a second inner elastic unit coupled to an upper portion of the bobbin, a second outer elastic unit and a second connection elastic unit connecting the second inner elastic unit and the second outer elastic unit, and wherein the elastic member is configured to support the bobbin, the method for obtaining an optimum focus comprising:

providing the mover at an initial position while no current is applied to the coil block, wherein a bottom surface of the first inner elastic unit of the first elastic member is spaced apart from the base by a first gap in a direction along or parallel to an optical axis and a top surface of the second inner elastic unit of the second elastic member is spaced apart from the cover by a second gap in the direction along or parallel to the optical axis, such that the first gap between the first inner elastic unit of the first elastic member and the base is smaller than the second gap between the second inner elastic unit of the second elastic member and the cover, and the bottom surface of the first inner elastic unit of the first elastic member is positioned below the bottom surface of the first outer elastic unit of the first elastic member in the direction along or parallel to the optical axis, and the top surface of the second inner elastic unit of the second elastic member is positioned below the top surface of the second outer elastic unit of the second elastic member in the direction along or parallel to the optical axis;

applying a backward current to the coil block of the mover in the initial position to move the mover in a first direction to a first position that a bottom surface of the bobbin approaches the base from the initial position, wherein the first direction is a direction from an upper surface of the bobbin to the bottom surface of the bobbin, such that the bottom surface of the first inner elastic unit of the first elastic member approaches the base from the initial position while a bottom surface of the first outer elastic unit of the first elastic member is stationary;

applying a forward current to the coil block after receiving the backward current to move the mover in a second direction, opposite to the first direction, toward a second position that the top surface of the second inner elastic unit of the second elastic member approaches the cover from the first position;

stopping the mover at a position past the optimum focus by increasing the forward current to the coil block;

returning the mover to a position corresponding to the optimum focus located between the first position and the second position by adjusting the forward current to the coil block; and maintaining the mover at the position corresponding to the optimum focus by maintaining an amount of the forward current, such that the optimum focus is formed.

2. The method of claim 1, wherein in the applying of the backward current to the coil block the first gap is decreased while the bobbin moves to the first position, and then in the applying of the forward current to the coil block the first gap is increased while the bobbin moves toward the second position.

3. The method of claim 1, wherein in the applying of the backward current to the coil block the second gap is increased and the first gap is decreased, and in the applying of the forward current to the coil block the second gap is decreased and the first gap is increased.

4. The method of claim 1, wherein the VCM is embedded in a camera comprising a lens coupled to the bobbin and an image sensor.

5. The method of claim 4, wherein the camera is embedded in a mobile phone.

6. The method of claim 1, wherein the bobbin is moved past the initial position from the first position as the backward current is reduced, and then the forward current is increased.

7. The method of claim 1, wherein a lens is coupled to the bobbin and the bobbin is supported by the first and second elastic members such that the bobbin is disposed at the initial position spaced from the base when stationary, the bobbin is to approach the base when the backward current is provided to the coil block at the initial position, and then a separation between the bobbin and the base is increased by reducing the backward current or providing the forward current flowing in a direction opposite of the backward current, wherein the bobbin is stopped when the optimum focus is formed between the lens and an image sensor.

8. The method of claim 1, wherein the elastic member supports the mover at the initial position, by providing the first gap between the bottom surface of the first inner elastic unit of the first elastic member and an upper surface of the base and by providing the second gap between the top surface of the second inner elastic unit of the second elastic member and an inner surface of the upper plate of the cover.

9. The method of claim 1, wherein in the returning of the mover the bobbin is moved to the position corresponding to the optimum focus by reducing the forward current to the coil block.

10. A method of driving a voice coil motor (VCM) that includes a stator including a magnet and a base, a mover including a bobbin and a coil block at a periphery of the bobbin, a cover coupled to the base, and an elastic member including a first elastic member and a second elastic member, wherein the first elastic member includes a first member connected to one end of the coil block and a second member connected to the other end of the coil block and separated from the first member, wherein each of the first member and the second member includes a first inner elastic unit coupled to a lower portion of the bobbin, a first outer elastic unit and a first connection elastic unit connecting the first inner elastic unit and the first outer elastic unit, and wherein the second elastic member includes a second inner elastic unit coupled to an upper portion of the bobbin, a second outer elastic unit and a second connection elastic unit connecting the second inner elastic unit and the second outer elastic unit, and wherein the elastic member is configured to support the bobbin, the method for obtaining an optimum focus comprising:

providing the mover at an initial position while no current is applied to the coil block, wherein a bottom surface of the first inner elastic unit of the first elastic member is spaced apart from the base by a first gap in a direction along or parallel to an optical axis and a top surface of the second inner elastic unit of the second elastic member is spaced apart from the cover by a second gap in the direction along or parallel to the optical axis, such that the first gap between the first inner elastic unit of the first elastic member and the base is smaller than the second gap between the second inner elastic unit of the second elastic member and the cover, and the bottom surface of the first inner elastic unit of the first elastic member is positioned below the bottom surface of the first outer elastic unit of the first elastic member in the direction along or parallel the optical axis, and the top surface of the second inner elastic unit of the second elastic member is positioned below the top surface of the second outer elastic unit of the second elastic member in the direction along or parallel to the optical axis;

applying a backward current to the coil block of the mover in the initial position to move the mover in a first direction to a first position that a bottom surface of the bobbin approaches the base from the initial position, wherein the first direction is a direction from an upper surface of the bobbin to the bottom surface of the bobbin, such that the bottom surface of the first inner elastic unit of the first elastic member approaches the base from the initial position while a bottom surface of the first outer elastic unit of the first elastic member is stationary;

applying a forward current to the coil block after receiving the backward current to move the mover in a second direction, opposite to the first direction, toward a second position that the top surface of the second inner elastic unit of the second elastic member approaches the cover from the first position;

stopping the mover at a position past the optimum focus by increasing the forward current to the coil block;

returning the mover to a position corresponding to the optimum focus located between the first position and the second position by reapplying the backward current to the coil block; and maintaining the mover at the position corresponding to the optimum focus by maintaining an amount of the backward current, such that the optimum focus is formed.

* * * * *